United States Patent [19]
Ogura

[11] Patent Number: 5,286,006
[45] Date of Patent: Feb. 15, 1994

[54] BEVEL CUTTING DEVICE

[75] Inventor: Susumu Ogura, Tokyo, Japan

[73] Assignee: Koike Sanso Kogyo Kabushiki Kaisha, Tokyo, Japan

[21] Appl. No.: 905,529

[22] Filed: Jun. 29, 1992

[51] Int. Cl.$^5$ .............................................. B23K 7/00
[52] U.S. Cl. ........................................ 266/77; 266/48
[58] Field of Search ........................ 266/48, 77, 76, 51

[56] References Cited

U.S. PATENT DOCUMENTS

| | | | |
|---|---|---|---|
| 2,492,526 | 12/1949 | Geibig | 266/77 |
| 3,868,095 | 2/1975 | Bauer et al. | 266/77 |
| 4,092,016 | 5/1978 | Roeder | 266/77 |
| 4,205,828 | 6/1980 | Hooper et al. | 266/77 |

*Primary Examiner*—Scott Kastler
*Attorney, Agent, or Firm*—Fitzpatrick, Cella, Harper & Scinto

[57] ABSTRACT

A bevel cutting device for cutting a bevel in a workpiece includes a frame and a vertical cutting torch, disposed on the frame, for cutting a root face of the workpiece. At least one bevel cutting torch is provided for cutting a bevel in the workpiece. The bevel cutting torch is disposed in parallel with the vertical cutting torch in a plate-cutting direction. An inclining section is coupled to the frame and inclines the bevel cutting torch about an axis parallel to the plate-cutting direction. The inclining section includes a motor gear disposed inside a casing and a link mechanism driven by the motor gear. The link mechanism is coupled to the bevel cutting torch. A shifting section is coupled to the frame and shifts the inclining section in a direction perpendicular to the plate-cutting direction.

20 Claims, 8 Drawing Sheets

BEVEL CUTTING DEVICE

FIELD OF THE INVENTION

The present invention relates to a device for cutting or forming X-bevels or Y-bevels at a cutting edge of a workpiece such as steel plate in preparation for welding the steel plate.

BACKGROUND OF THE INVENTION

When constructing buildings by welding steel plates and shaped steel, the most suitable weld joint will be selected by considering the condition and the intended purpose of the welded structure. For instance, when welding two steel plates side by side at their ends, a lap joint will be selected, and when welding one steel plate to the other at right angles, a T-joint will be selected. In these joints, V-bevels or X-bevels will be made at the welding side of the steel plates to accommodate the welding medium.

A V-bevel has a face (called a root face) which is perpendicular (vertical) to the surface of the steel plate, and above this root face the bevel is made which has a certain depth and angle with respect to the surface of the plate, (see FIG. 2). An X-bevel has a root face in the middle of the steel plate thickness and bevels are made above and below the root face, (see FIG. 2). The bevel angle and bevel depth will be predetermined by such welding conditions as the thickness and material of the steel plate, the welding method chosen, and so on.

A steel plate having a V-bevel or an X-bevel at one side is usually cut off from a steel material which has a larger size but the same thickness as the steel plate by using a cutting device having a gas torch for cutting the root face and a gas torch for cutting the bevel face. When cutting the steel plate from the steel material, the cutting size and the cutting shape are set in advance. The cutting size and shape are determined by the dimensions and location of the root face.

U.S. Pat. No. 4,205,828 to Hooper discloses cutting the side of a steel plate aslant. This patent describes vertical (root face) cutting and slant (bevel) cutting one after the other. Namely, Hooper teaches to cut the edge of the steel plate twice with a single torch. Thus, the Hooper cutting device only cuts the root face or the bevel at one time, and it cannot make a V-bevel or an X-bevel at the end of the steel plate in one operation.

In Hooper, the mechanism to incline the torch comprises a cylinder moved by liquid pressure, which rotates a lever, and following its rotation, the torch is inclined. Thus, it is impossible for the device to finely control the angle of the torch to match it to the angle of the desired bevel.

On the other hand, a known bevel cutting device to cut an X-bevel or a Y-bevel has a vertical cutting torch to cut the root face and a bevel cutting torch to cut the bevels. This kind of device has an arc rail along which the bevel torch inclines at a right angle to a direction of the torch's cutting direction, and a shifting means to move the torch at a right angle to the torch's cutting direction. This kind of cutting device is usually set on a cross-shifting stand which is loaded on a moving stand running along the lengthwise direction of steel material. The vertical cutting torch and the bevel cutting torch cut plates according to data set up in advance (e.g., entered into a numerically controlled cutting device) by controlling the moving stand and the cross-shifting stand along the root face.

The arc rail has a rack along all of its range. A holder for supporting the bevel cutting torch has a motor to set the angle of the beveling, and the motor is attached to the rack with a pinion. By driving the motor to rotate the pinion, the bevel cutting torch and its holder move along the arc rail, and then the bevel cutting torch can be inclined to the desired angle.

The shifting means is constructed so as to avoid interference between the vertical cutting torch and the bevel cutting torch by shifting the arc rail in the side direction of the cross-shifting stand (i.e., perpendicular to the plate-cutting direction).

With this known bevel cutting device, the rack of the arc rail and the pinion are exposed to the working environment of the gas-cutting equipment. Therefore, iron powder, dust, and other debris produced by the cutting equipment easily adhere to the rack and the pinion and obstruct the smooth gearing thereof. For example, if iron powder sticks between the rack and the pinion causing a gearing problem, this will obstruct the smooth moving of the bevel cutting torch and make it impossible to precisely incline the torch at the desired angle.

For this reason, the known bevel cutting device needs frequent maintenance to keep the device in good working condition. This creates problems like a decline of work efficiency and difficulty in operation.

SUMMARY OF THE INVENTION

This invention is intended to solve the above-discussed problems, and its object is to remove the influence of the iron powder and dust produced when steel plates are cut by providing a torch moving mechanism which is not exposed to the working atmosphere, and providing a bevel cutting device which makes it possible to rotate the torch smoothly.

To achieve this object, a bevel cutting device according to the present invention has a link to which the bevel cutting torch is attached, and by rotating the link on a fulcrum at a bottom thereof, the device 10 inclines the bevel cutting torch at the desired angles. Because the device shifts the bevel cutting torch in a direction perpendicular to the plate-cutting direction, the torch can be located to keep enough distance between the bevel cutting torch and the vertical cutting torch to avoid mutual interference and to keep the iron powder and dust away from the link mechanism.

Preferably, the device of this invention has a motor to drive the link, and gears to transfer the power of the motor to the fulcrum of the link, the motor and gears being enclosed inside a casing. Therefore, iron powder and dust will not influence the mechanism for moving the torch, and the torch can be inclined smoothly without gear problems.

According to one aspect of the present invention, a bevel cutting device for cutting a bevel in a steel plate includes a frame, and a vertical cutting torch disposed on the frame for cutting a root face of the steel plate. At least one bevel cutting torch is provided for cutting a bevel in the steel plate, the bevel cutting torch being disposed in parallel with the vertical cutting torch in a plate-cutting direction. An inclining section is coupled to the frame and is provided for inclining the bevel cutting torch about an axis parallel to the plate-cutting direction. The inclining section includes a motor gear disposed in a casing and a link mechanism driven by the motor gear. The link mechanism is coupled to the bevel cutting torch. A shifting section is also coupled to the frame and is provided for shifting the inclining section in a direction perpendicular to the plate-cutting direction.

According to another aspect of the present invention, a bevel forming device includes a vertical forming member for forming a vertical face on a workpiece in a plate-cutting direction. A bevel forming member is provided for forming, on the workpiece, a bevel face which intersects the vertical face. Inclining apparatus is coupled to the vertical and bevel forming members and inclines the bevel forming member at an angle with respect to the vertical forming member in a plane orthogonal to the plate-cutting direction. The inclining apparatus includes a dust-proof case for housing a driving device and a motor shifting apparatus is provided for varying a relative distance between the vertical forming member and the bevel forming member in a direction perpendicular to the plate-cutting direction.

According to yet another aspect of the present invention, apparatus for holding a bevel forming member and a vertical forming member so that said members may form a bevel on a workpiece comprises a vertical holding means for holding the vertical forming member, and a bevel holding means for holding the bevel forming member. Means are provided for driving the bevel holding means to vary an angle between the bevel holding means and the vertical holding means. A casing is provided for enclosing the driving means, and a link mechanism is provided for coupling the means for driving to the bevel holding member. The link mechanism is coupled to the casing at a pivot portion, the link mechanism being disposed above said pivot portion.

DETAILED DESCRIPTION OF THE PREFERRED EMBODIMENT

The bevel cutting device of the present invention will now be explained with reference to the drawings as follows.

Figure 1:
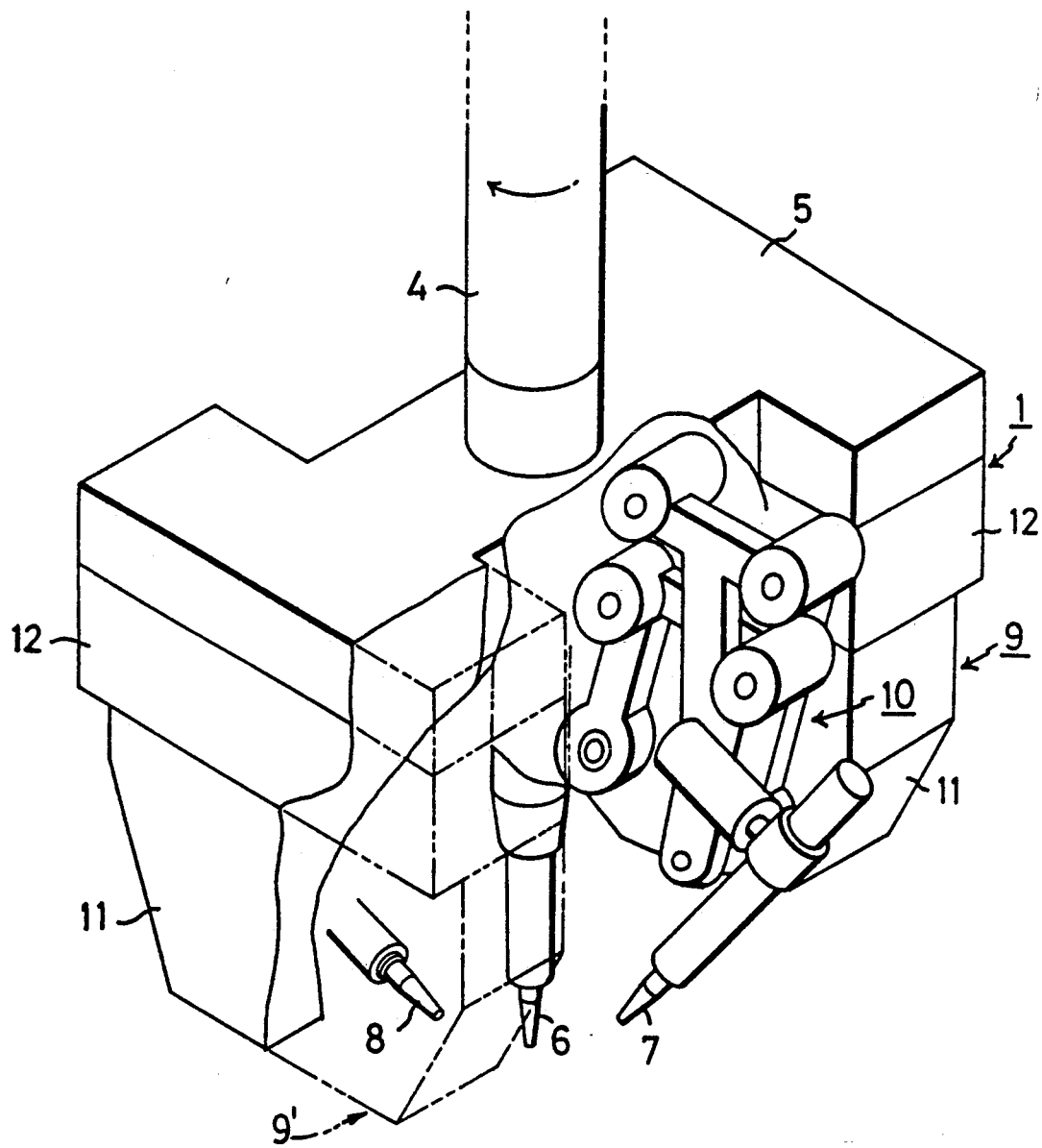
FIG. 1 is a perspective view of a bevel cutting device according to the present invention.
Figure 2:
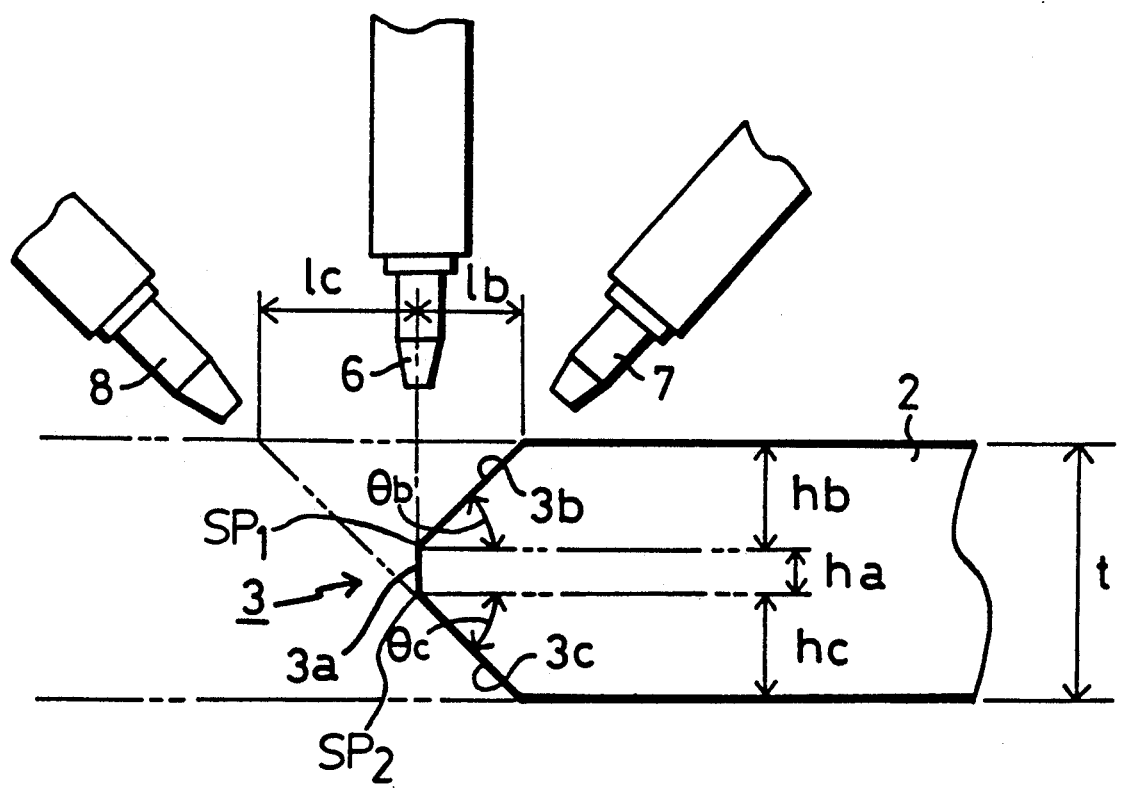
FIG. 2 is a section view of a steel plate for explaining the bevel-shape.

The bevel cutting device shown in FIG. 1 is used for simultaneously cutting root face 3a, upper bevel 3b, and lower bevel 3c at the cutting edge of a steel plate 2, as shown in FIG. 2.

The bevel cutting device 1 is set on a cross-moving stand (not shown) of a numerically controlled main body (not shown), and is attached to the end of a shaft 4 which is caused to rotate by the main body apparatus. The bevel cutting device 1 is attached on the frame 5 so as to be orthogonal to the steel plate 2, and it has a vertical cutting torch 6 for cutting root face 3a and bevel cutting torches 7, 8 for cutting the upper and lower bevels 3b, 3c. Bevel cutting torches 7 and 8 are disposed in front of and behind the vertical cutting torch 6 with respect to a direction perpendicular to the moving direction of the vertical cutting device 6 (the plate-cutting direction). The vertical torch 6 is attached to the frame 5 directly, and the bevel cutting torches 7, 8 are attached to the frame 5 with a inclining mechanism 9.

Now, the inclining mechanism 9 will be described. The bevel cutting device 1 has two inclining mechanisms 9, 9' which respectively hold the bevel cutting torches 7, 8 and have the same structure. Here, only one inclining mechanism 9 for the bevel cutting torch 7 will be explained although the explanation applies to both inclining mechanisms.

Figure 3:
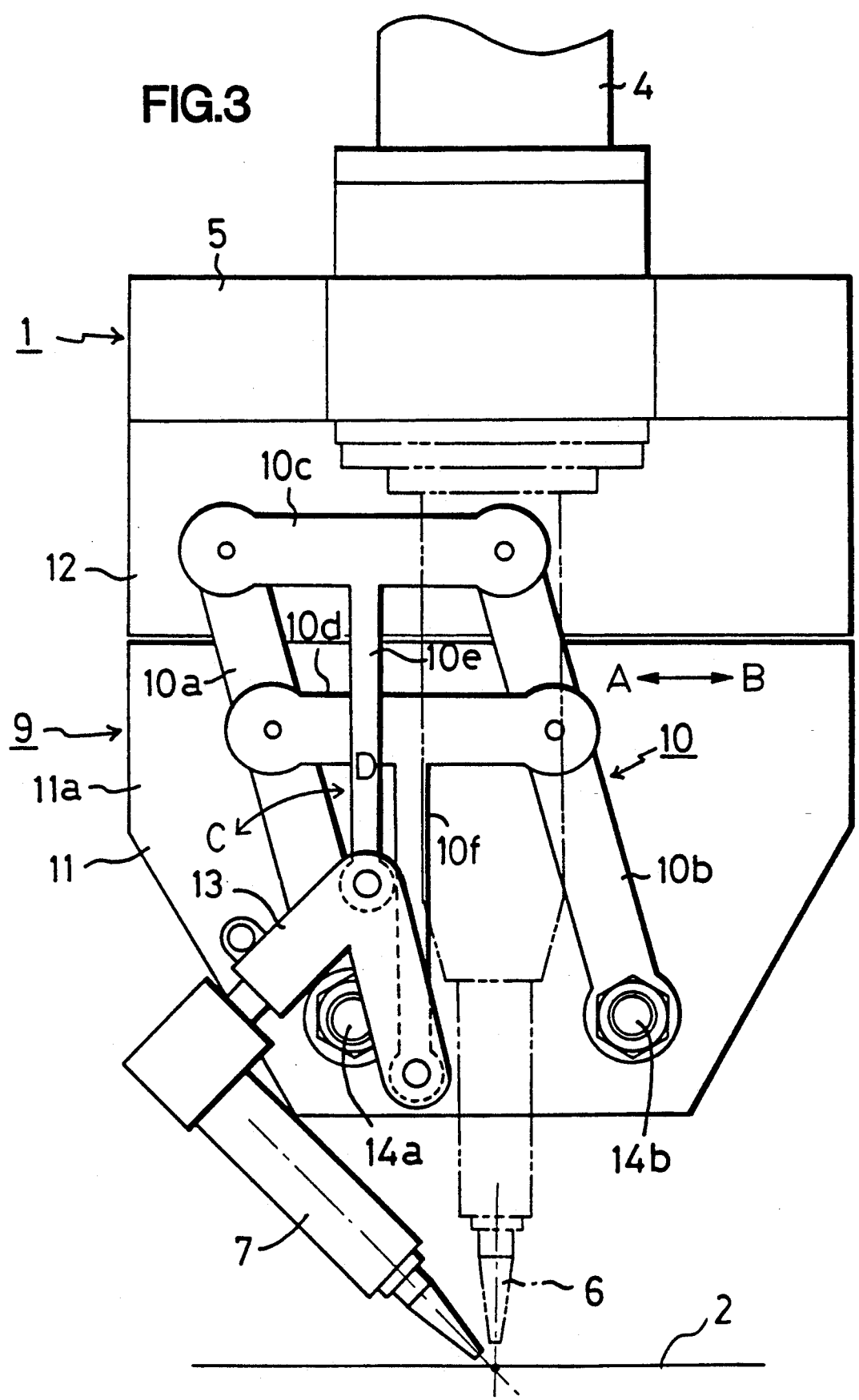
FIG. 3 is a front view of a torch inclining device according to the present invention.

The mechanism 9 comprises an inclining part 11 (FIG. 1) which has a link mechanism 10 for inclining the bevel cutting torch 7 to the desired bevel angle, and a shift section 12 attached to the frame 5 for moving the inclining section 11 in a direction perpendicular to the plate-cutting direction, namely in the moving direction of the bevel cutting device 1 (the direction as shown by arrows A, B, in FIG. 3).

The link mechanism 10 comprises two lengthwise links 10a, 10b (FIG. 3) disposed parallel to each other, a first lateral link 10c coupled to the upper ends of the lengthwise links 10a, 10b, and a second lateral link 10d disposed parallel to the first lateral link 10c and attached to the lengthwise links 10a, 10b slightly above central portions thereof. The first and second lateral links 10c, 10d respectively have arms 10e, 10f which extend downward from the center of the lateral links 10c, 10d, and a torch holder 13 is attached to each of the ends of those arms 10e, 10f. Bearings (not shown) are provided at each of the connecting points of the links 10a, 10b, 10c, 10d, 10e, 10f.

The lengthwise links 10a, 10b are attached to rotary supporting (pivot) points 14a, 14b on a casing 11a of the inclining section 11 at lower ends of the links 10a, 10b, and supporting points 14a, 14b are constructed so as to rotate the link mechanism 10 in the direction of arrows C,D by a driving gear 15.

Figure 4:
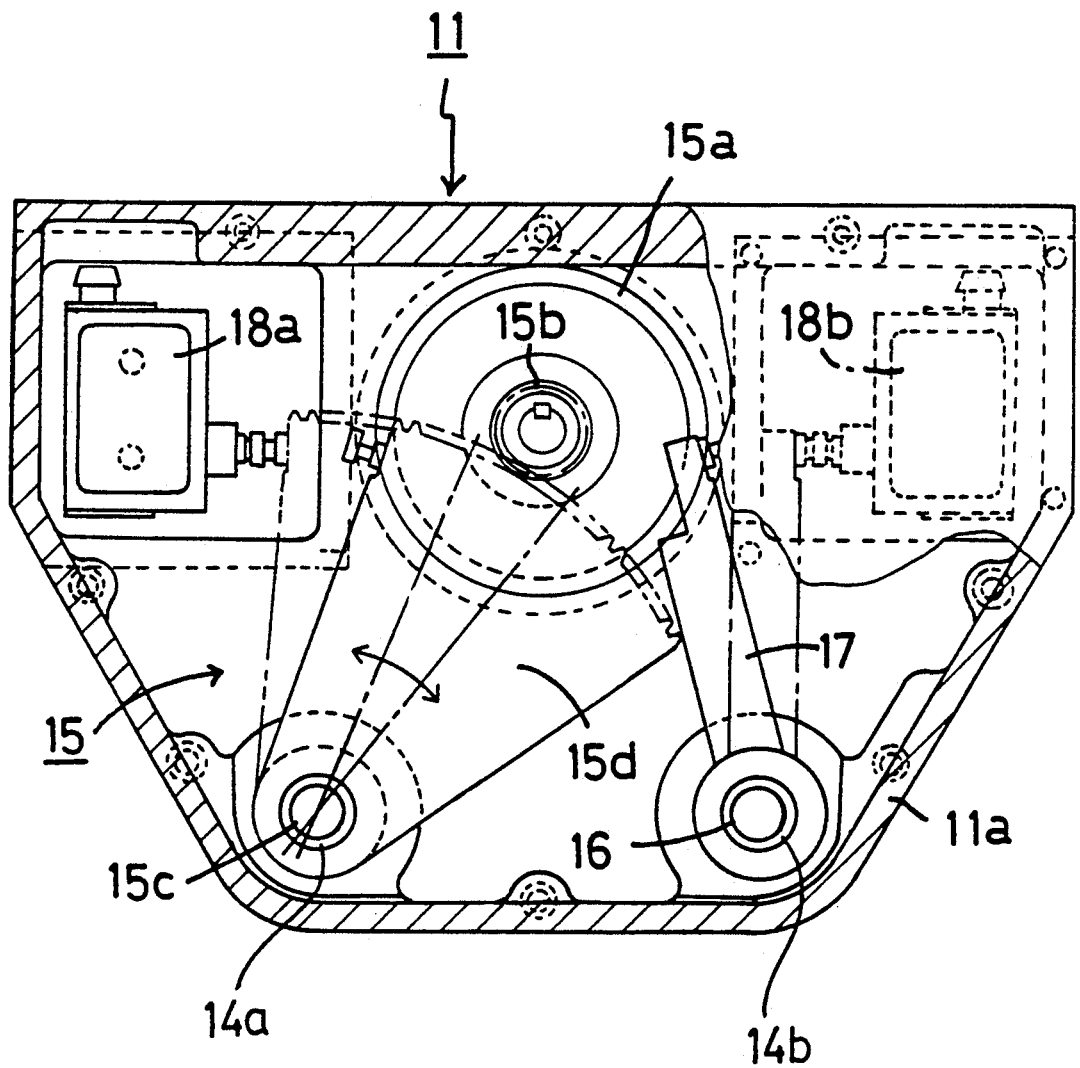
FIG. 4 is an enlarged section front view of a driving section of the link.

The driving gear 15, which is for moving the link mechanism 10, comprises an inclining motor 15a (FIG. 4) fixed to the casing 11a, gears 15b attached to the inclining motor 15a, a shaft 15c disposed through the casing 11a at the supporting point 14a, and a sector gear 15d connected to both the lengthwise link 10a by the shaft 15c and to the gear 15b. A forward and reverse driving motor (like a pulse motor) may be selected as the inclining motor 15a.

A shaft 16 is disposed through casing 11a at the supporting point 14b. The lengthwise link 10b is attached to one end of the shaft 16 and a dog 17 is attached to the other end of shaft 16.

A switch 18a for limiting the rotation of the link mechanism 10 in the arrow C direction, and for signaling if the beveling cutting torch 7 is inclined to a maximum angle is disposed to contact the sector gear 15d in the casing 11a. A switch 18b for limiting the rotation of the link mechanism in the arrow D direction, and for signaling if the bevel cutting torch 7 stands vertically is also disposed in casing 11a to contact the dog 17.

Figure 5:
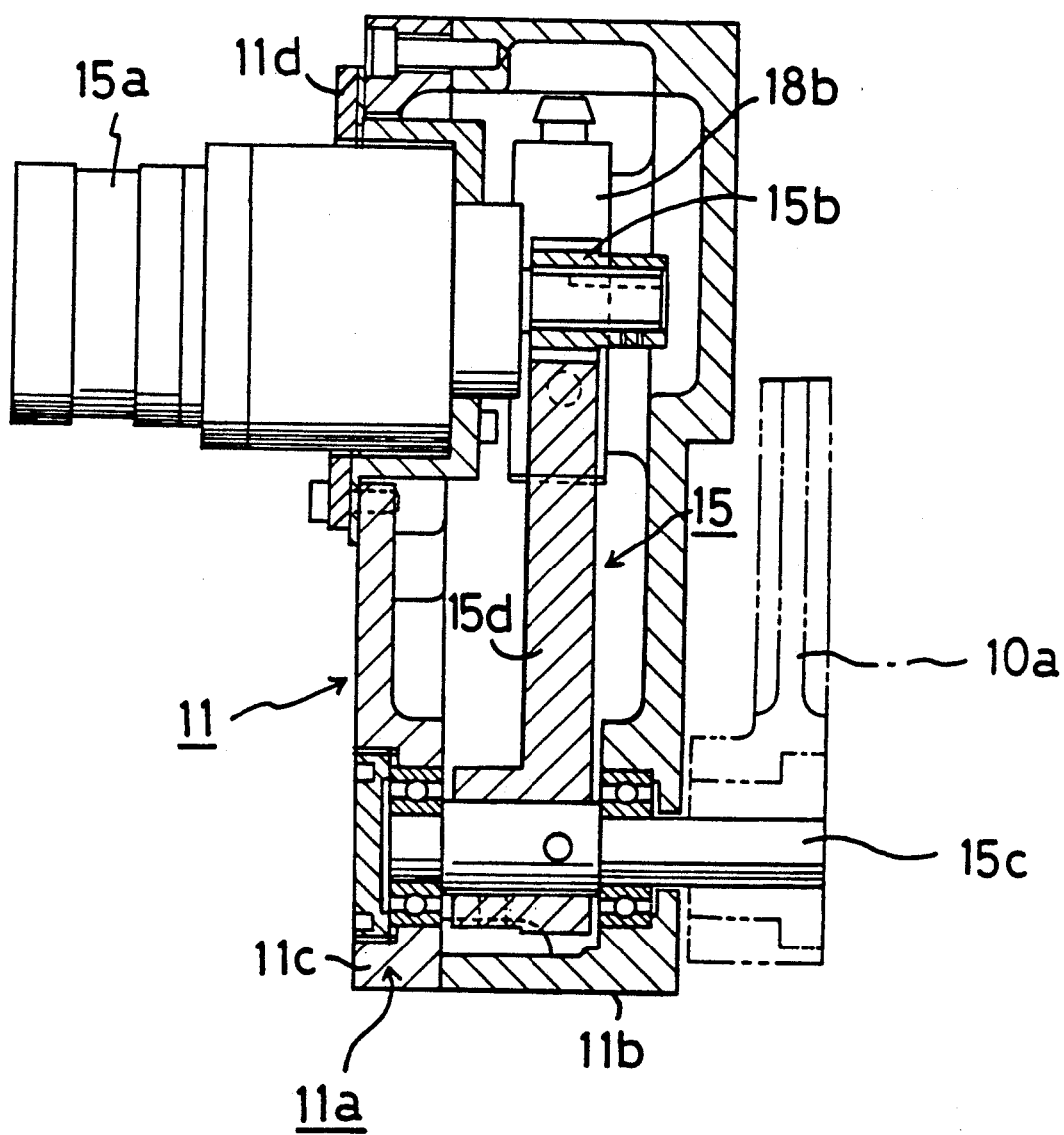
FIG. 5 is an enlarged section side view of a driving section of the link according to the present invention.

The casing 11a (having the driving gear 15 and the switches 18a, 18b disposed inside, and attached to the link mechanism 10 outside) comprises a main body 11b (FIG. 5) which is monobloc-casted, and a lid 11c for making the casing 11a airtight. The motor 15a is fixed to the lid 11c and the space between them is sealed with a cap lid covering the motor 15a. For these reasons, iron powder and dust will not enter into the inside of the casing 11a, and the gears 15b, 15d will not be influenced by such debris.

In the link mechanism 10 and motor gear 15 described above, by driving the motor 15a in a forward or reverse direction, the sector gear 15d rotates and then the lengthwise link 10a rotates in the direction C or D. For example, by rotating the lengthwise link 10a in the direction C, this rotation of the lengthwise link 10a causes the lateral links 10c, 10d and the lengthwise link 10b to rotate in the direction C. Namely, the link mechanism 10 rotates in the direction C. Then, from the rotation of the link mechanism 10, the holder 13 and the bevel cutting torch 7 incline together with the arms 10e, 10f.

The inclining of the bevel cutting torch 7 is performed by setting the center of the inclination (pivot point) at the intersection between an extension line of the torch 7 and a surface of the steel plate 2 (see FIG. 3).

When cutting a steel plate vertically, the distance between a surface of the steel plate 2 and the end of the torches 6, 7, 8 is kept to a predetermined standard distance.

On the other hand, when making a bevel cut 3 shown in FIG. 2, a standard point $SP_1$ of the upper bevel 3b is set on the upper edge of the root face 3a, and a standard point $SP_2$ of the lower bevel 3c is set on the lower edge of the root face 3a. Thus, it is necessary to shift the bevel cutting torches 7, 8 in the side direction perpendicular to the plate-cutting direction so that the extension lines of the torches 7, 8 respectively intersect the standard points.

The side moving of the bevel cutting device 7 is performed by controlling the shift section 12 (FIG. 3) to move the casing 11a of the inclining section 11 in the direction of arrow A, B.

Figure 6:
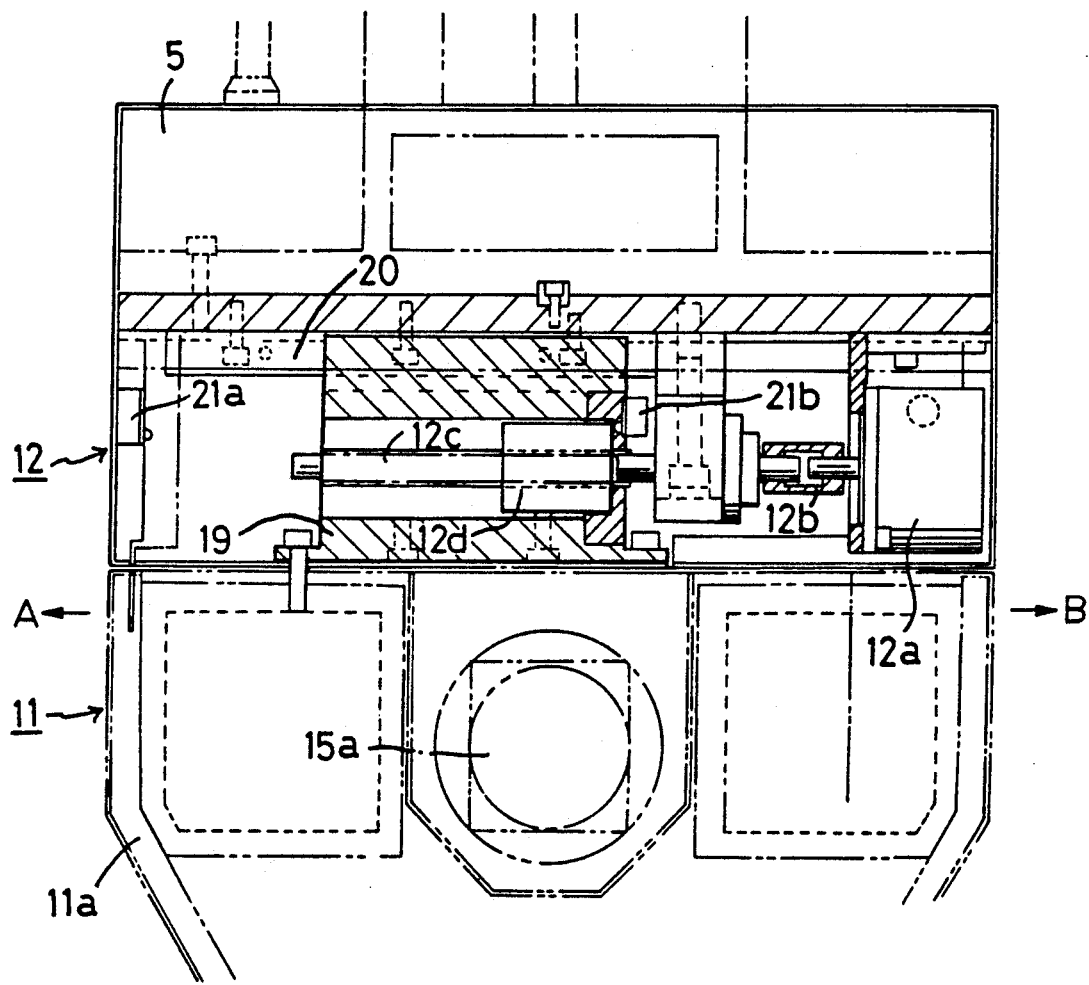
FIG. 6 is a front section view of a shifting section according to the present invention.

The shift section 12 comprises a shifting motor 12a (FIG. 6), which may be a forward and reverse driving motor (like a pulse motor), threaded mandrel 12c connected to the shifting motor 12a by a connector 12b and a sliding block 19 having a nut 12d threaded onto the threaded mandrel 12c, the casing 11a of the inclining portion 11 being fixed to the sliding block 19.

Figure 7:
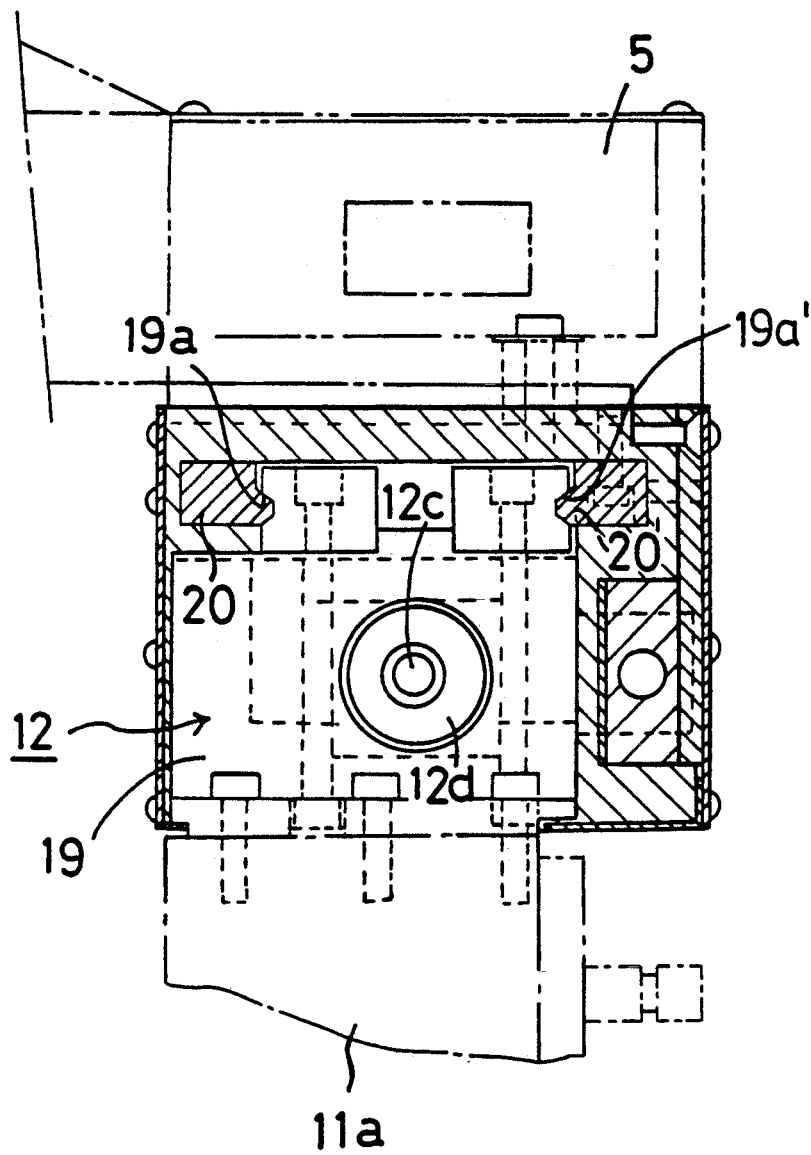
FIG. 7 is a side section view of a shifting section according to the present invention.

A pair of guide rails 20, 20' (FIG. 7) is disposed under frame 5 along the entire moving range of the sliding block 19. By disposing the grooves 19a, 19a' (FIG. 7) of the sliding block 19 onto the guide rails 20, 20', the guide rails 20, 20' can support the weight of the inclining section 11, namely the weights of the bevel cutting torch 7, the link mechanism 10, the casing 11a, and the motor gear 15 (which are hung on the sliding block 19), as well as guiding the sliding block 19 in the direction A, B. In this way, the bevel cutting torches 7, 8 may be moved in the direction A, B independent of the vertical cutting torch 6.

At the farther end from the shifting motor 12a of the moving range of the sliding block 19, there is disposed a switch 21a (FIG. 6) to stop the movement of the sliding block 19 by blocking it, as well as to signal that the sliding block 19 has reached the end of its movement in direction A. At the other end of the moving range of the sliding block 19, there is also disposed a switch 21b to stop the movement of the sliding block 19 in the direction B, as well as to signal that the bevel cutting torch 7 is at its starting point whereat the extension lines of the bevel cutting torch 7 and the vertical cutting torch 6 intersect on the surface of the steel plate 2.

A control system of the bevel cutting device 1 will be explained next with respect to FIG. 8.

Figure 8:
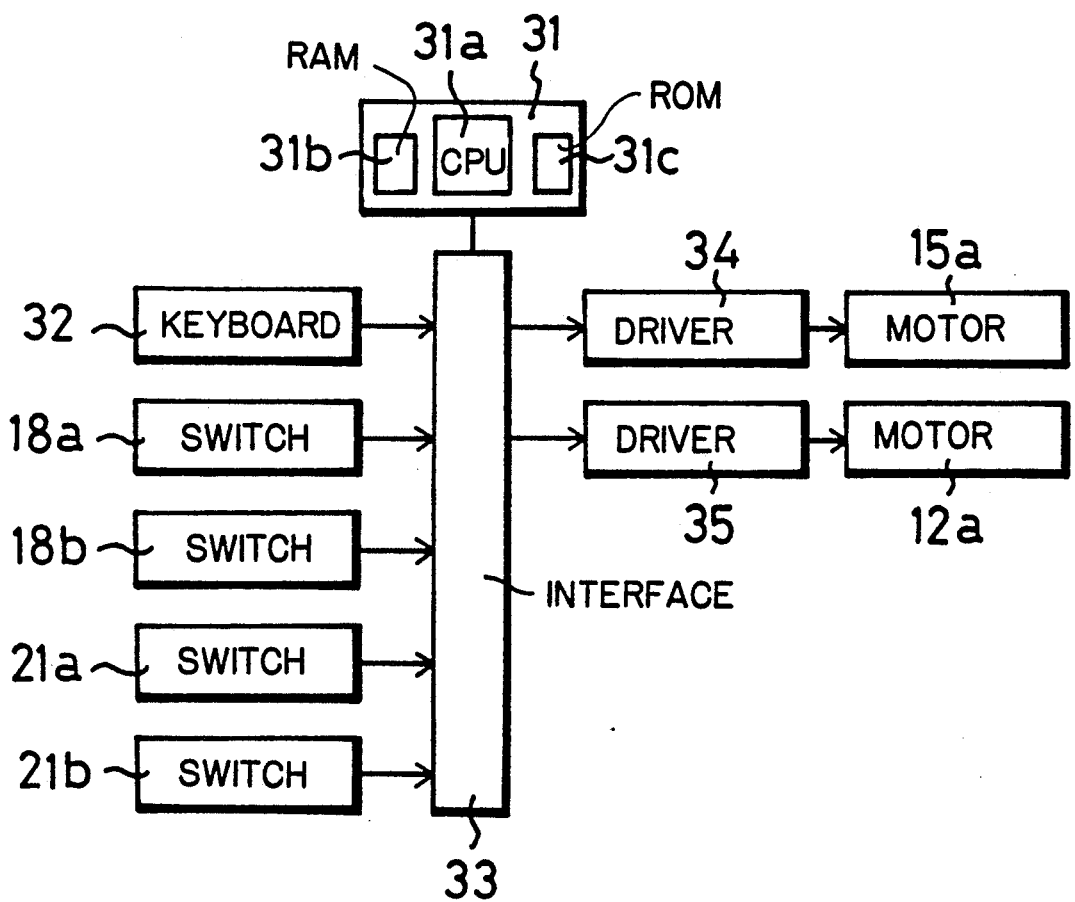
FIG. 8 is a block diagram of a control system according to the present invention.

In FIG. 8, a control section 31 comprises calculating circuitry (such as a CPU) 31a, a temporary memory (such as a RAM) 31b, and a memory 31c (such as a ROM). Also, the control system has an input device 32 (for example a keyboard), an interface 33, and motor drivers 34, 35. The information from the switches 18a, 18b of the inclining section 11, and from the switches 21a, 21b of the shifting section 12 are connected to the interface 33.

In this control system, when inputting information to set the conditions for forming the desired beveling shape (like the thickness t (FIG. 2) of the steel plate, height ha of the root face 3a, beveling angle $\Theta$b and depth hb of the upper bevel 3b, beveling angle $\Theta$c and depth hc and so on), the inputted data are passed to the control section 31 through the interface 33 to be stored in the temporary memory 31b.

The memory 31c stores a calculation program to calculate the rotation of the inclining motor 15a which is necessary for inclining the bevel cutting torches 7, 8 to the bevel angles $\Theta$b, $\Theta$c of the upper and lower bevels 3b, 3c. The memory 31b also stores a calculation program to calculate the shifting distances 1b, 1c of the bevel cutting torches 7, 8 in accordance with the bevel angles $\Theta$b, $\Theta$c, thickness t of the steel plate 2, height ha of the root face 3a, and depths hb, hc of the bevels 3b, 3c using the formula $1 = h/\tan\Theta$. Memory 31c may also store programs to control the working process of the bevel cutting device 1 itself, such as movement of the cross-moving stand, etc.

The process of operating the bevel cutting device will now be explained as follows.

When inputting information regarding the shape of bevel 3 through the input device, this information is stored in the temporary memory 31b. Then, by inputting a starting signal for beginning the operation of the bevel cutting device 1 through the input device 32, the calculating section 31a reads the programs from the memory 31c to process the information stored in the temporary memory 31b using the programs.

The shifting distances 1b, 1c will be calculated using the data of the bevel angles $\Theta$b, $\Theta$c. After this calculation is complete, the control section 31 outputs signals to drivers 24 and 25 to drive the inclining motor 15a and the shifting motor 12a.

The drivers 24, 25 supply electricity corresponding to the given signals to the motors 15a, 12a, and then the link mechanism rotates in the direction C or D to incline the bevel cutting torch 7, 8, as well as to shift the inclining section 11 in the direction A or B. The motors 15a, 12a stop when they rotate to desired angles corresponding to signals from the control section 31. As described above, the bevel cutting device 1 can both incline and shift the bevel cutting torches 7, 8.

The control system of this embodiment uses the absolute system, in which data regarding the present degrees of rotation of the motors 15a, 12a with respect to predetermined absolute starting points, i.e., 0°) are memorized in the temporary memory 31b.

With the rotation of the link mechanism 10, when the sector gear 15d contacts the switch 18a, a signal from the switch 18a is supplied to the control section 31, and then the control section 31 stops the inclining motor 15a since the bevel cutting torch 7 is inclined to 45 degrees, the maximum angle of inclination for the torch 7. On the other side, when the dog 17 contacts the switch 18b, the signal from the switch 18b is supplied to the control section 31, and then the control section 31 stops the inclining motor 15a since the bevel cutting torch 7 is back at the starting position.

The same as with the link mechanism 10, when the sliding block 19 of the shifting section 12 contacts the switch 21a, the control section 31 knows that the inclining section 11 has reached the maximum shifting position and stops the shifting motor 12a. On the other side, when the sliding block 19 contacts the switch 21b, the control section 31 knows that the inclining section 11 stands at the minimum shifting position, the starting position, and stops the shifting motor 12a.

As described above, this bevel cutting device 1 can incline the bevel cutting torches 7, 8 corresponding to predetermined angles set up in advance. The bevel cutting device 1 can also shift the torches 7, 8 laterally in response to the bevel angles and bevel depth set in advance. The construction of the casing and the link mechanism prevents metal powder and other debris from retarding the smooth operation of the inclining and shifting mechanisms.

The individual components shown in outline or designated by blocks in the drawings are all well-known in the bevel forming arts, and their specific construction and operation are not critical to the operation or best mode for carrying out the invention.

While the present invention has been described with respect to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A bevel cutting device for cutting a bevel in a steel plate, comprising:
    a frame;
    a vertical cutting torch, disposed on said frame, for cutting a root face of the steel plate;
    at least one bevel cutting torch for cutting a bevel in the steel plate, said bevel cutting torch being disposed in parallel with said vertical cutting torch in a plate-cutting direction;
    an inclining section, coupled to said frame, for inclining said bevel cutting torch about an axis parallel to said plate-cutting direcction, said inclining section including a motor gear disposed in a casing and a link mechanism driven by said motor gear, said link mechanism being coupled to said bevel cutting torch, said link mechanism comprising four link arms coupled together to form a rectangular shape; and
    a shifting section, coupled to said frame, for shifting said inclining section in a direction perpendicular to the plate-cutting direction.

2. A bevel cutting device according to claim 1, wherein said link mechanism comprises one pair of lengthwise links and one pair of lateral links connected to each other in the form of a square.

3. A bevel cutting device according to claim 2, wherein a first lateral link of said pair of lateral links is attached to upper ends of said lengthwise links, wherein a second lateral link of said pair of lateral links is attached to said lengthwise links at points just above centers of said lengthwise links, and wherein said lateral links have respective arms which are coupled to said bevel cutting torch.

4. A bevel cutting device according to claim 1, wherein said inclining section has a sector gear, a pivoting point of said sector gear being coupled to said link mechanism, and wherein a swinging end of said sector gear is coupled to said motor gear.

5. A bevel cutting device according to claim 4, wherein, said inclining section includes:
    a dog connected to said link mechanism;
    a first switch disposed to contact said swinging end of said sector gear to stop said motor gear when said sector gear contacts said first switch; and
    a second switch disposed to contact a swinging end of said dog to stop said motor gear when said dog contacts said second switch.

6. A bevel cutting device according to claim 1, wherein said shifting section comprises:
    a shifting motor;
    a threaded mandrel coupled to said shifting motor;
    a nut coupled to said threaded mandrel;
    a sliding block fixed to said nut and coupled to said inclining section; and
    a guide rail disposed to engage said sliding back for supporting the weight of said inclining section.

7. A bevel cutting device according to claim 6, wherein said shifting section includes:
    a first switch disposed at a farther end of a moving range of said sliding block from said shifting motor to switch off said shifting motor when said sliding block contacts said first switch; and
    a second switch disposed at the other end of the moving range of said sliding block to switch off said shifting motor when said sliding block contacts said second switch.

8. A bevel forming device comprising:
    a vertical forming member for forming a vertical face on a workpiece in a plate-cutting direction;
    a bevel forming member for forming, on the workpiece, a bevel face which intersects the vertical face;
    inclining apparatus, coupled to said vertical and bevel forming members, for inclining said bevel forming member at an angle with respect to said vertical forming member in a plane orthogonal to the plate-cutting direction, said inclining apparatus including (1) a driving means for driving the inclining apparatus, (2) a dust-proof casing enclosing said driving mechanism, and (3) a link mechanism for holding said bevel forming member and comprising four link arms coupled together in the shape of a rectangle; and
    shifting apparatus for varying a relative distance between said vertical forming member and said bevel forming member in a direction perpendicular to the plate-cutting direction.

9. A device according to claim 8, wherein said inclining apparatus includes:
    said driving mechanism for rotating said link mechanism;
    a motor for driving said driving mechanism; and
    wherein said casing encloses said motor and said driving mechanism.

10. A device according to claim 9, wherein said link mechanism is disposed outside said casing.

11. A device according to claim 9, wherein said link mechanism comprises two lengthwise links and two lateral links coupled together at mutual ends thereof to form a parallelogram interior angles of the parallelogram changing as said inclining apparatus inclines said bevel forming member.

12. A device according to claim 8, wherein said vertical forming member and said bevel forming member each comprise a metal-cutting torch.

13. A device according to claim 8, wherein said inclining apparatus includes a link mechanism, coupled to said casing at a pivot point, for inclining said bevel forming mechanism, said pivot point being disposed at a lowest portion of said link mechanism.

14. Apparatus for holding a bevel forming member and a vertical forming member so that said members may form a bevel on a workpiece, comprising:
vertical holding means for holding the vertical forming member;
bevel holding means for holding the bevel forming member;
means for driving said bevel holding means to vary an angle between said bevel holding means and said vertical holding means;
a casing for enclosing said means for driving; and
a link mechanism for coupling said means for driving to said bevel holding member, said link mechanism being coupled to said casing at a pivot portion, said link mechanism being disposed above said pivot portion, said link mechanism comprising four link arms coupled together in the shape of a rectangle.

15. Apparatus according to claim 14, further comprising another bevel holding member adapted for holding another bevel forming member which may form another bevel on the workpiece.

16. Apparatus according to claim 14, wherein said means for driving includes a motor and a transmission gear coupling said motor to said link mechanism.

17. Apparatus according to claim 14, further comprising shifting means, movably coupled to said casing, for changing a relative distance between said bevel holding member and said vertical holding member in a direction parallel to a plane of the angle between said bevel holding means and said vertical holding means.

18. Apparatus according to claim 14, said link mechanism comprises two lengthwise links and two lateral links coupled at their ends to form a parallelogram the internal angles of which vary as the angle between said vertical holding member and said bevel holding member varies.

19. Apparatus according to claim 14, further comprising a bevel cutting torch and a vertical cutting torch, for cutting the workpiece.

20. Apparatus according to claim 14, wherein said casing is substantially dust-proof.

* * * * *